Oct. 21, 1969  A. E. PECH  3,473,934
METHOD OF PROCESSING FOOD PRODUCTS IN GLASS CONTAINERS
Filed July 19, 1965  13 Sheets-Sheet 1
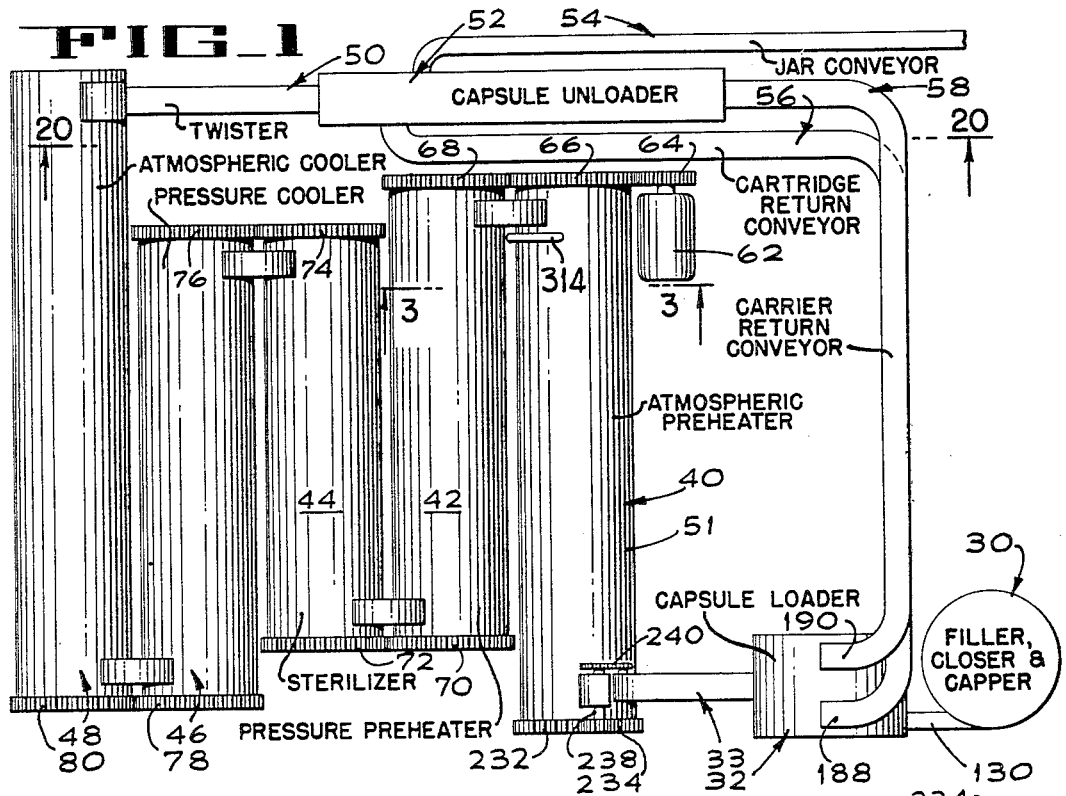
FIG_1
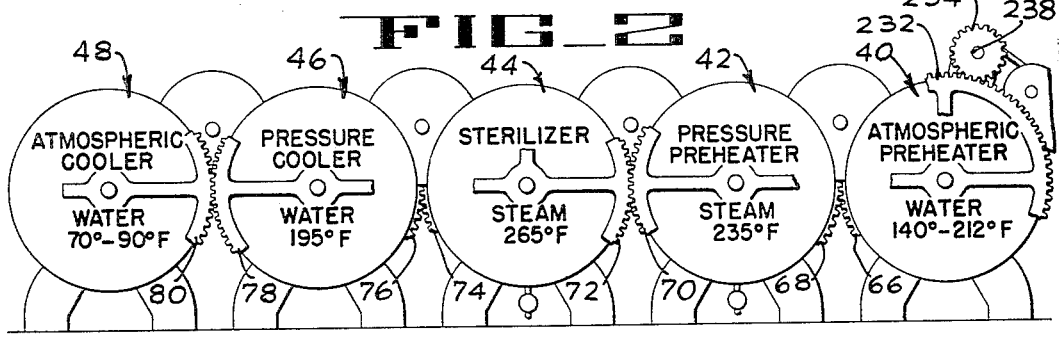
FIG_2
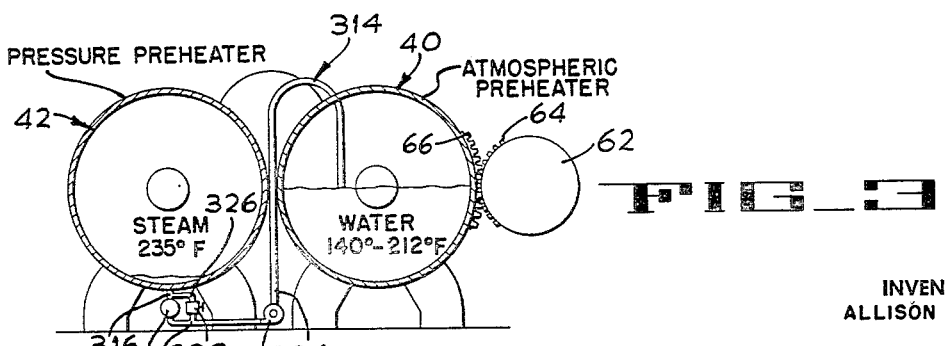
FIG_3
INVENTOR
ALLISON E. PECH
BY [signature]
ATTORNEY Oct. 21, 1969  A. E. PECH  3,473,934
METHOD OF PROCESSING FOOD PRODUCTS IN GLASS CONTAINERS
Filed July 19, 1965  13 Sheets-Sheet 2
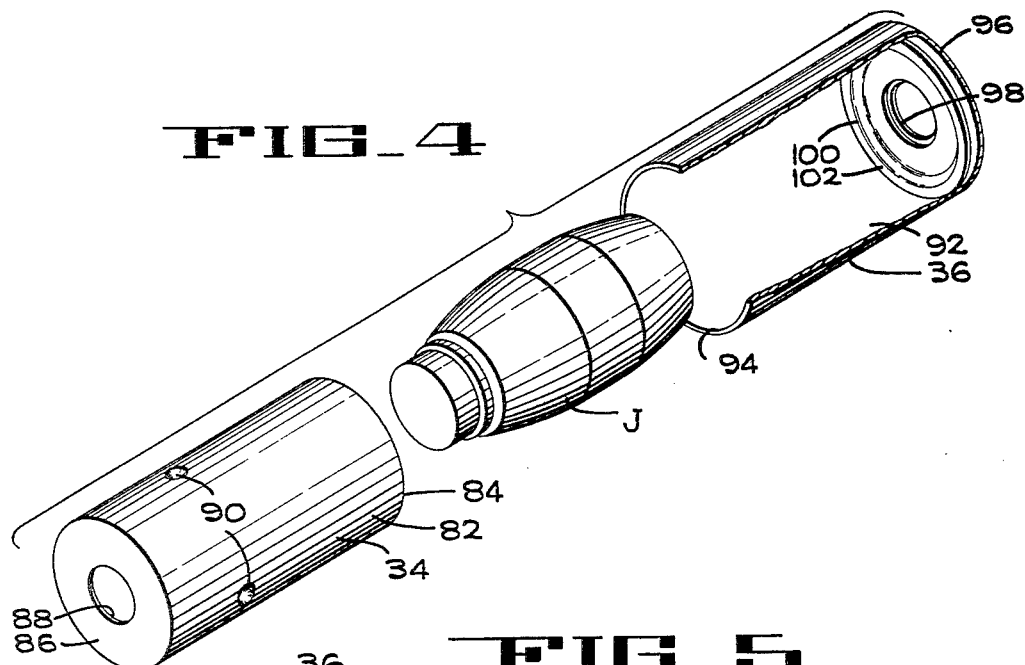
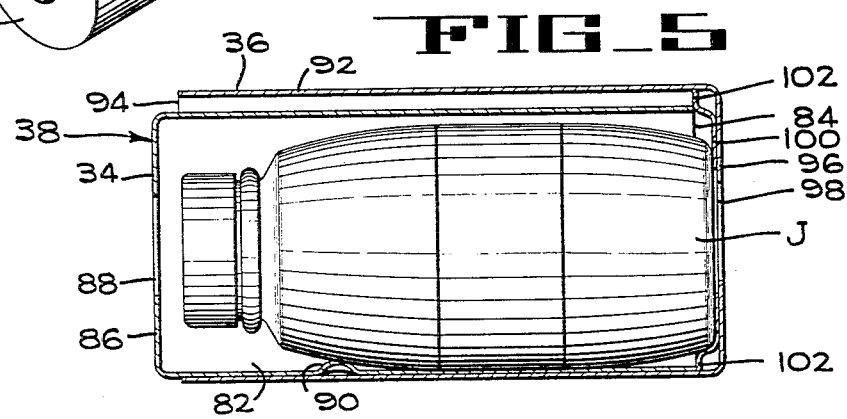
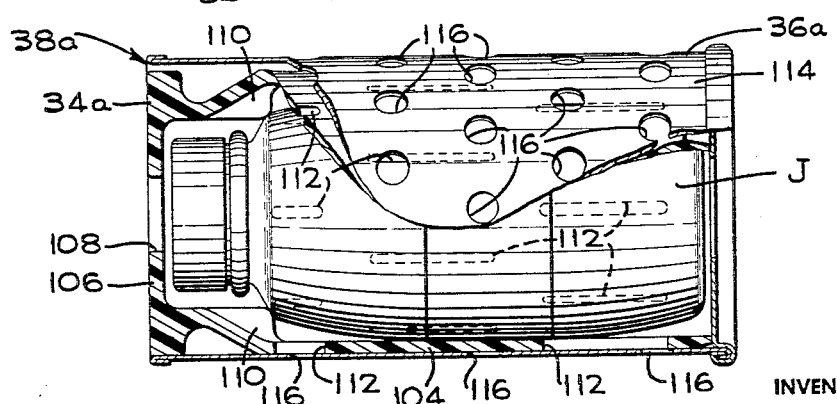
INVENTOR
ALLISON E. PECH
BY Hans G. Hoffmeister
ATTORNEY

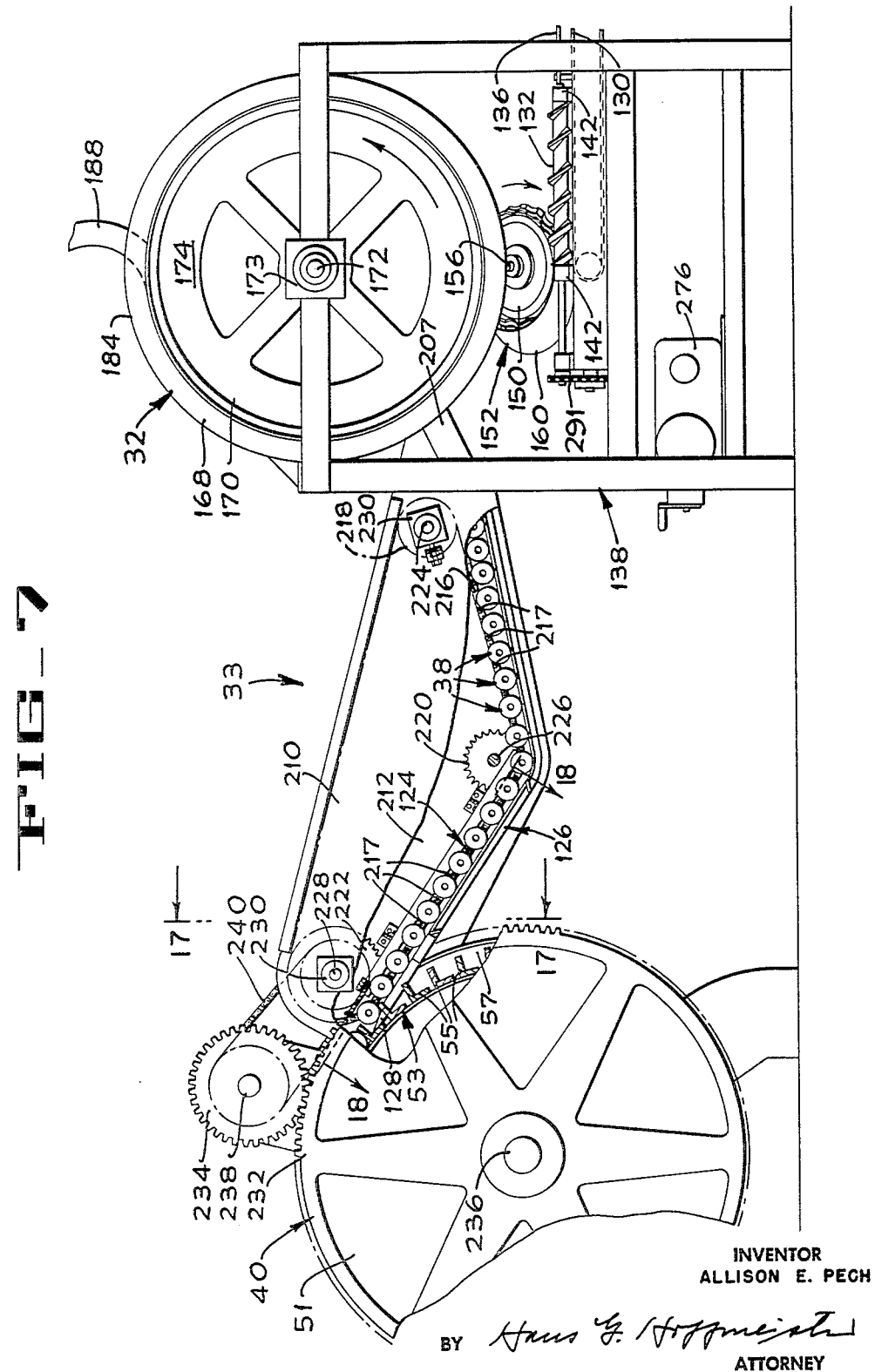

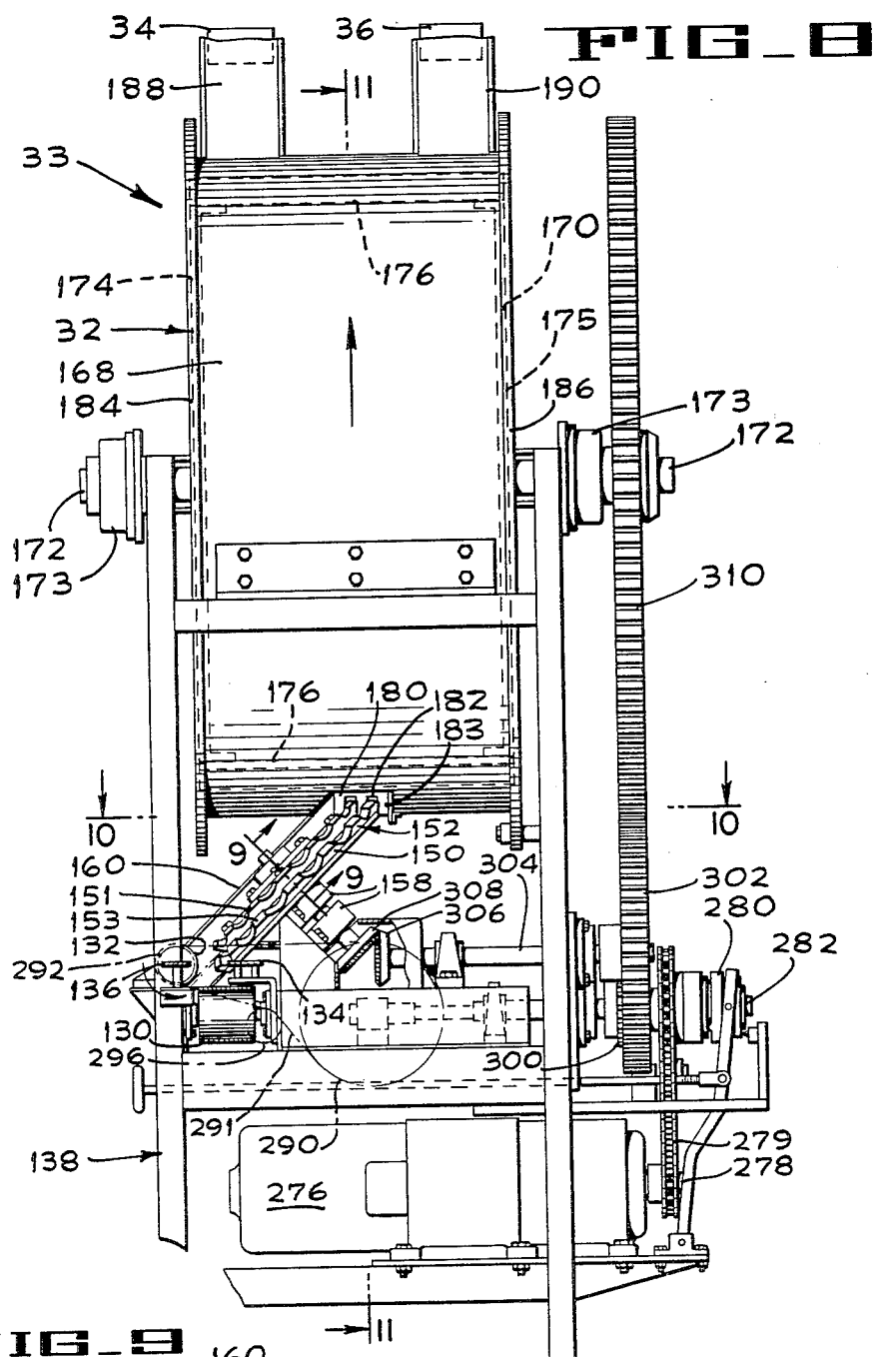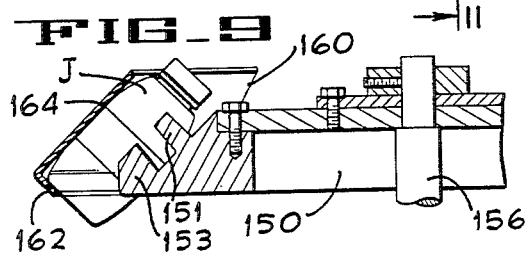

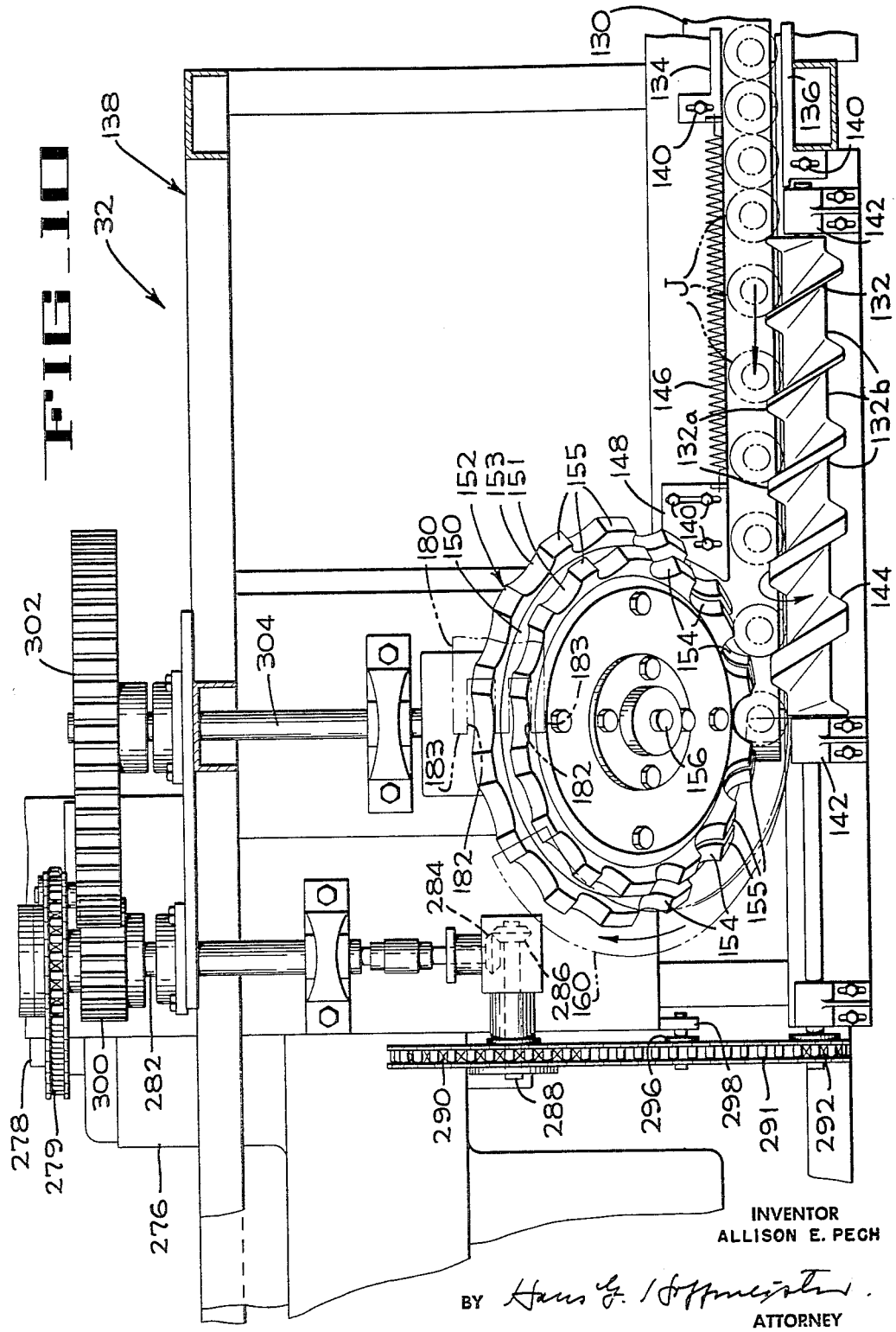

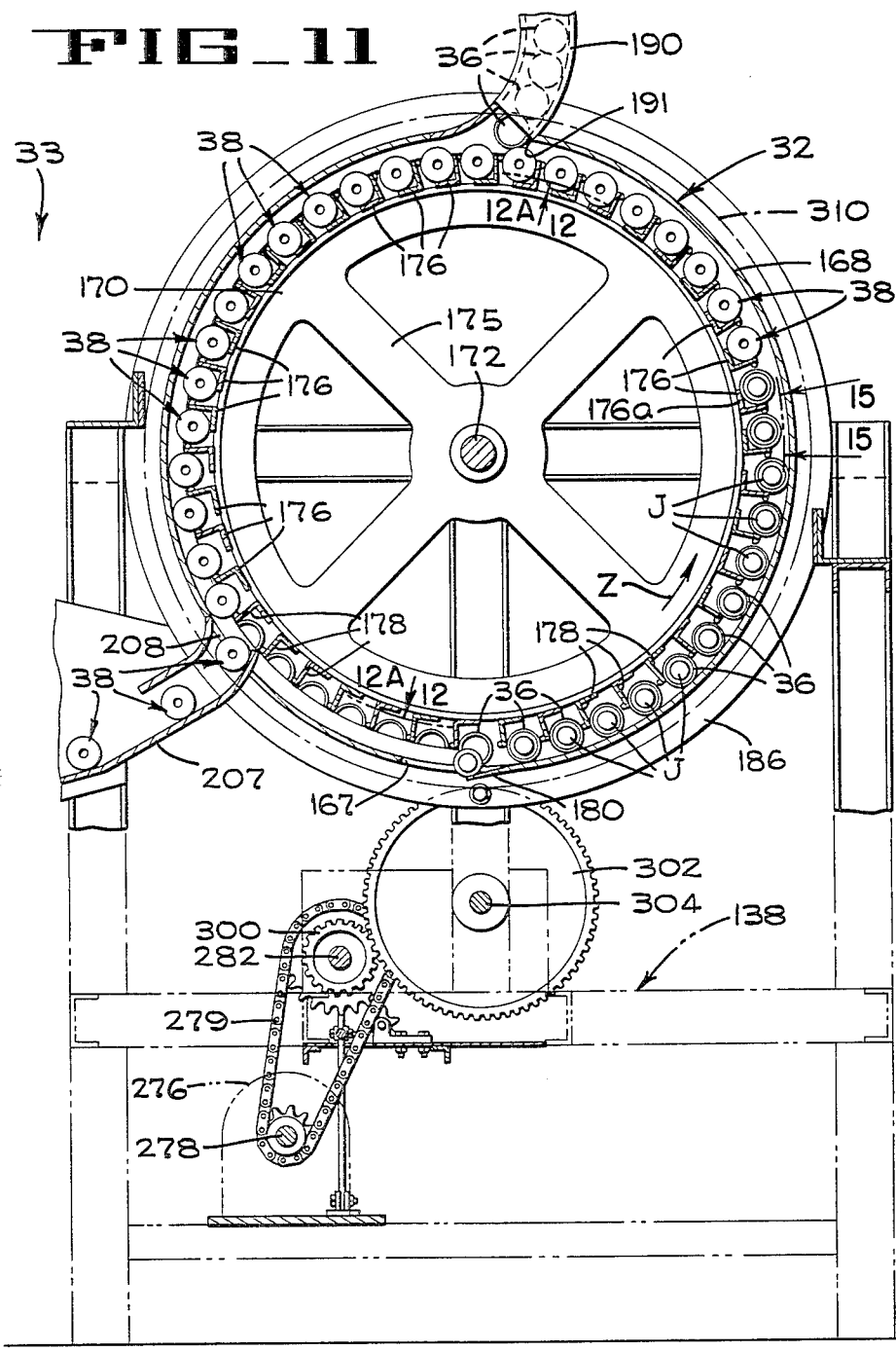

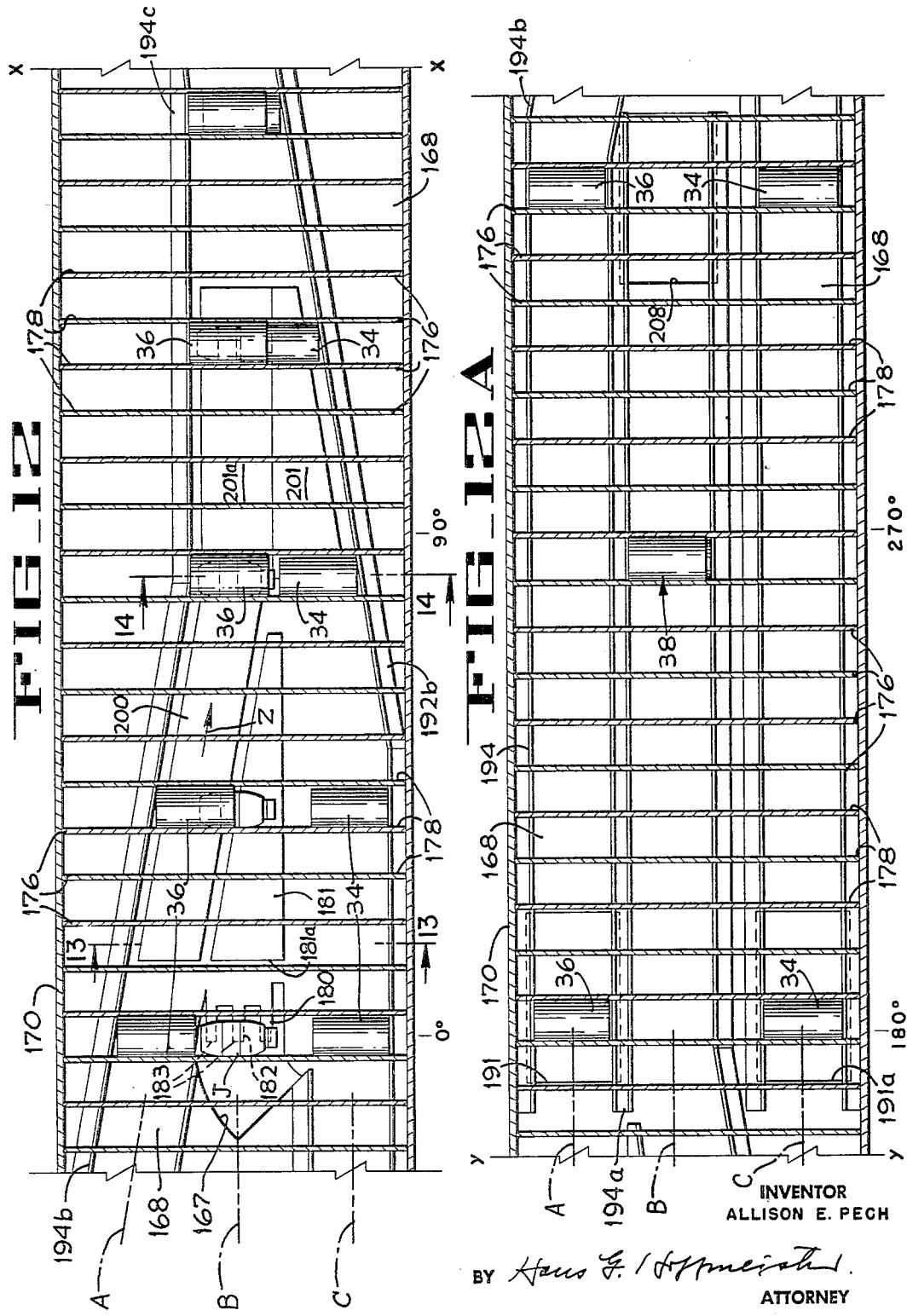

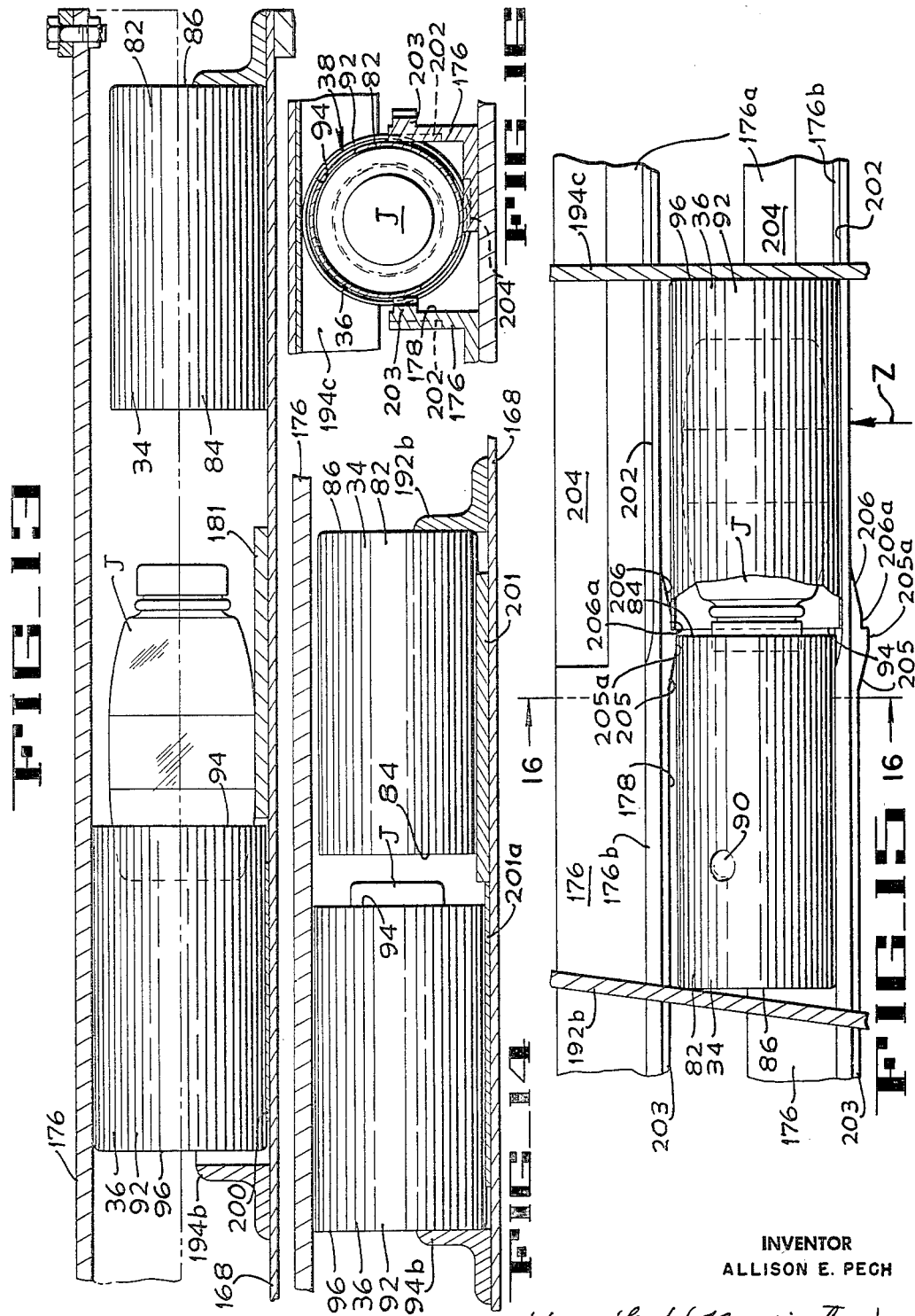

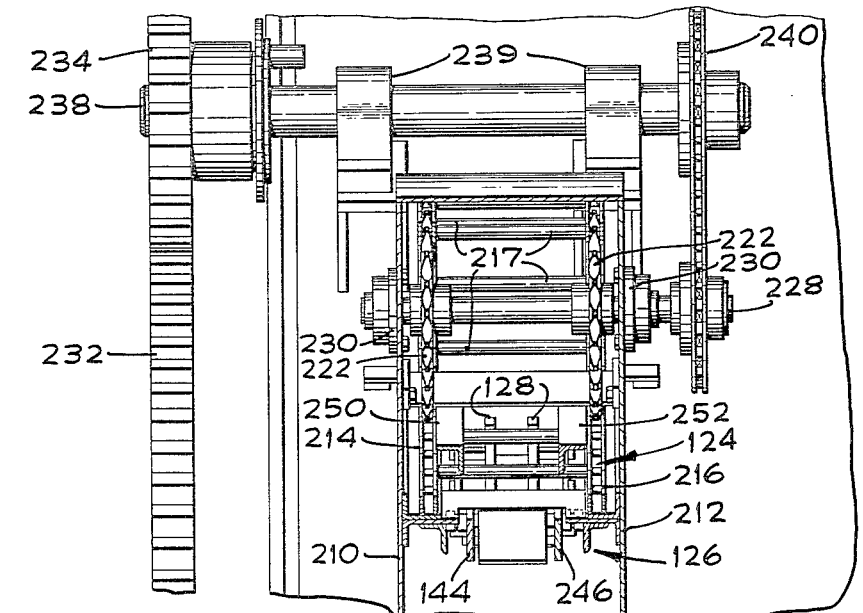
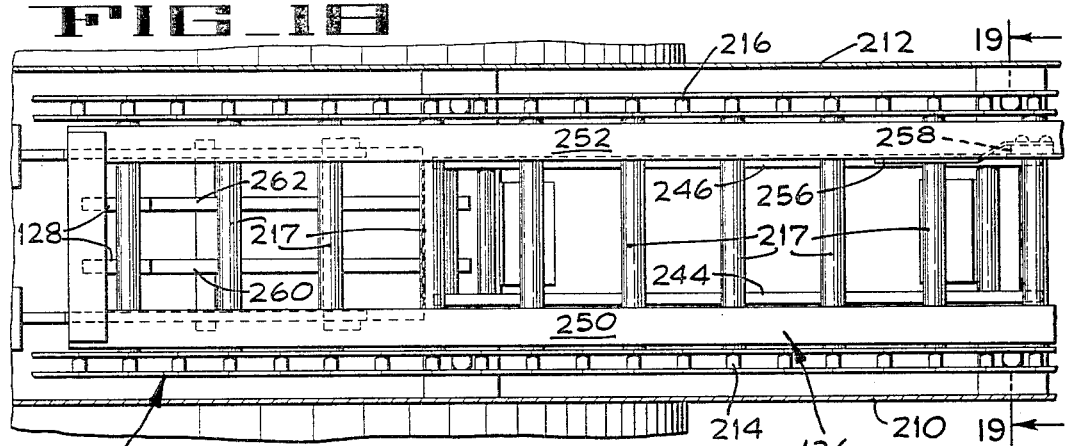
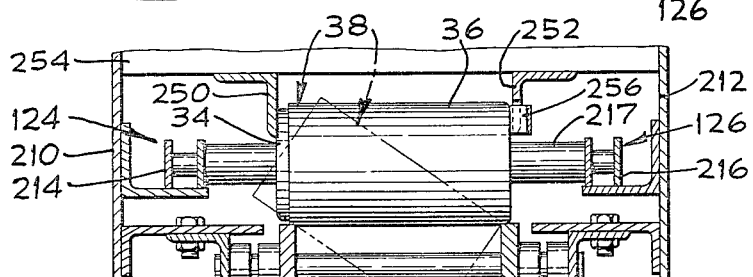

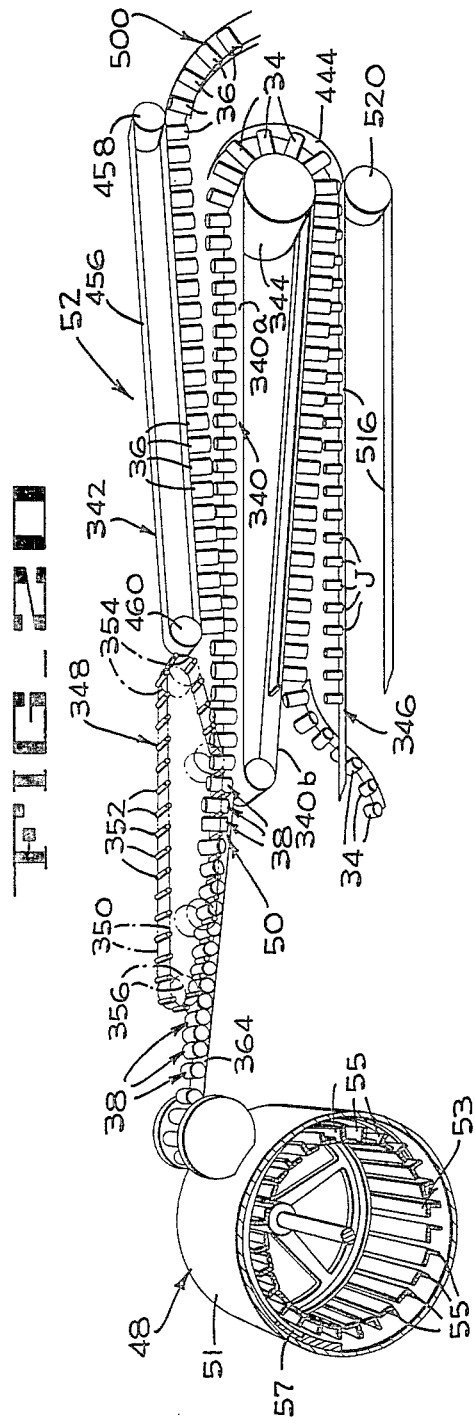

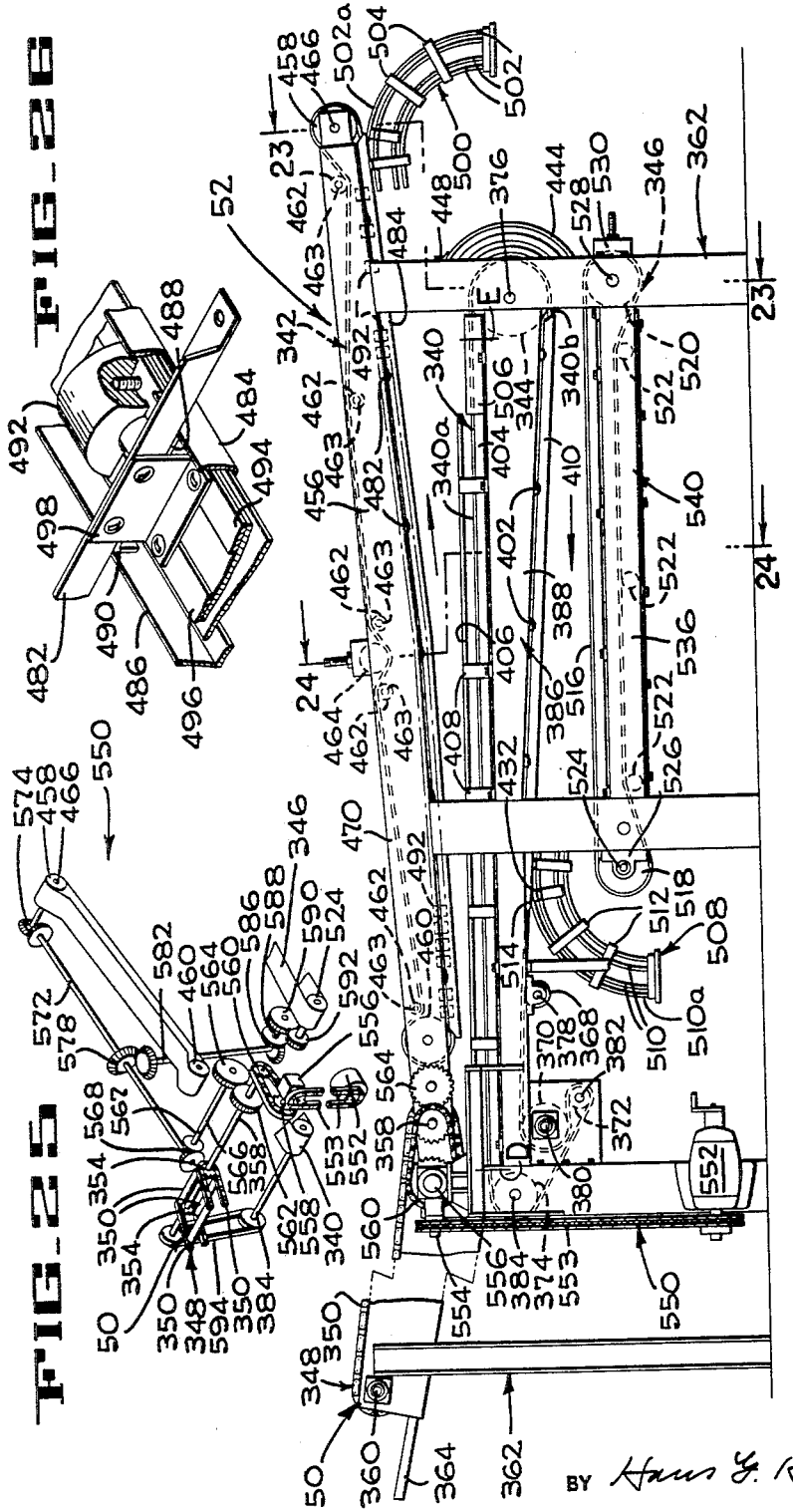

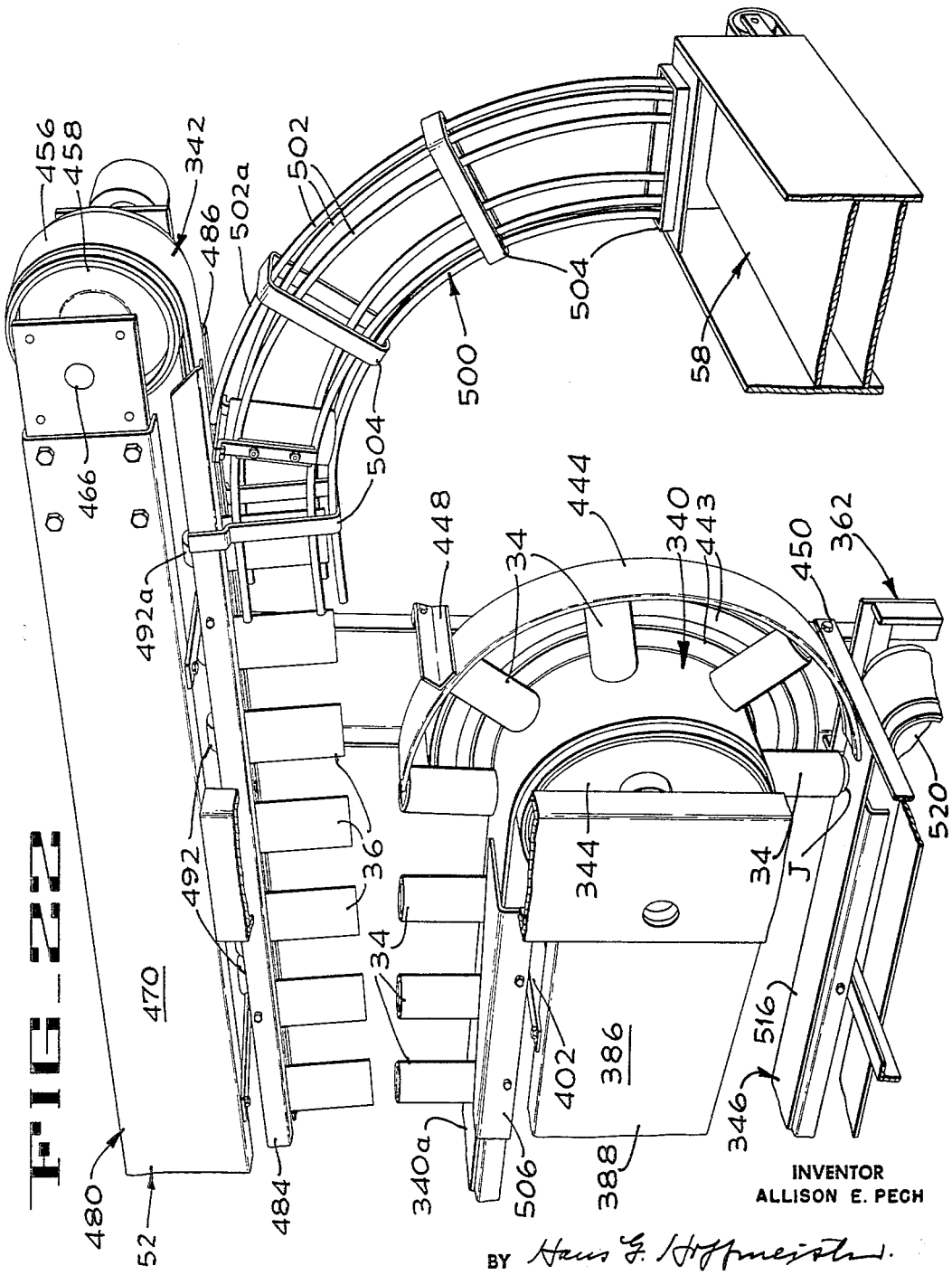

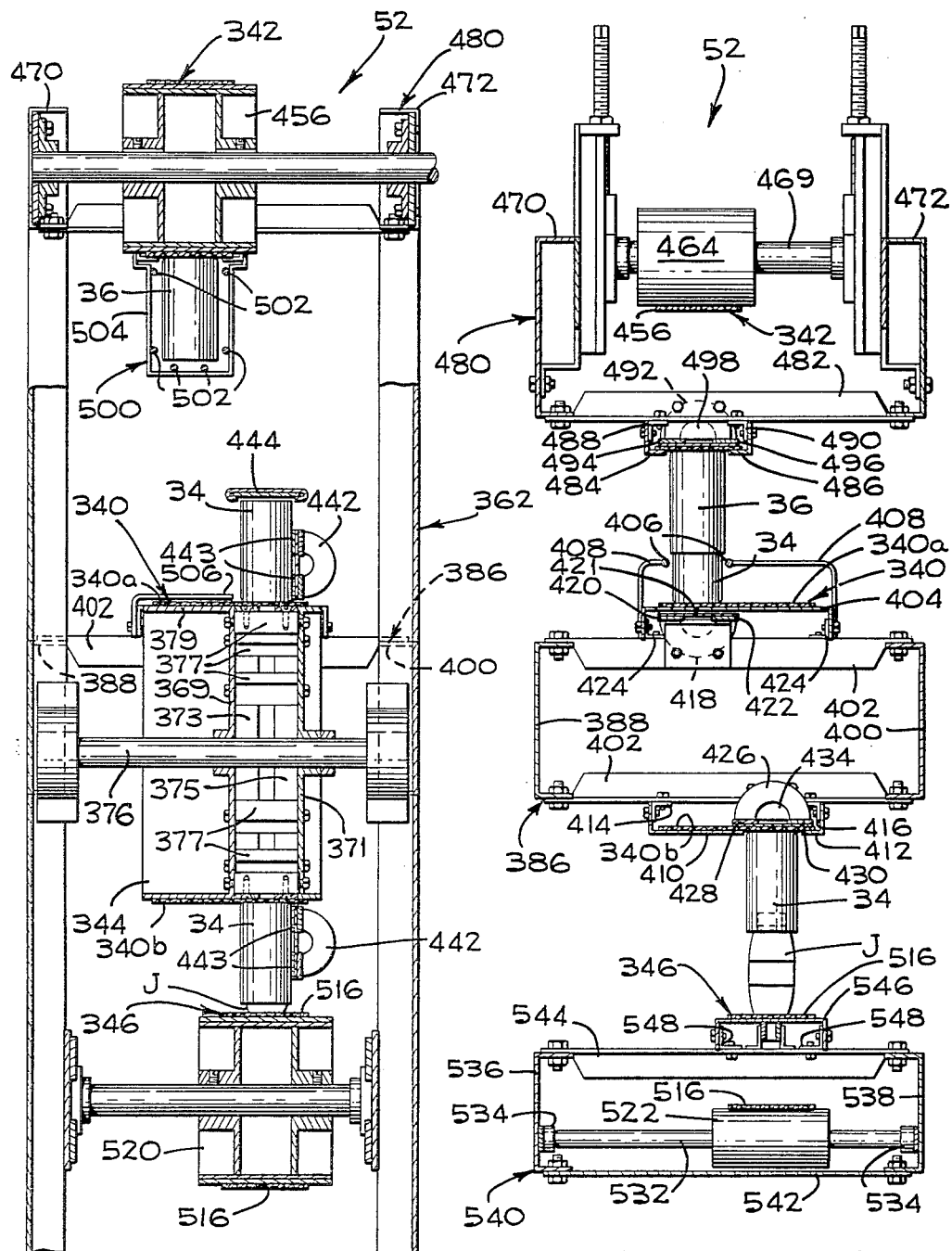

United States Patent Office 3,473,934
Patented Oct. 21, 1969

3,473,934
METHOD OF PROCESSING FOOD PRODUCTS IN GLASS CONTAINERS
Allison E. Pech, San Jose, Calif., assignor to FMC Corporation, San Jose, Calif., a corporation of Delaware
Filed July 19, 1965, Ser. No. 473,107
Int. Cl. A23l 3/02
U.S. Cl. 99—214
4 Claims

ABSTRACT OF THE DISCLOSURE

A method of processing frangible or deformable containers in a reel and spiral type cooking and cooling system. Each container is individually confined in a capsule before the container is introduced into the heat treatment medium, and remains in confinement until after the container, whether intact or broken, has moved through and out of the heat treatment medium.

---

The present invention pertains to a continuous sterilizing system and more particularly relates to a method of and apparatus for processing products in containers such as glass jars and bottles.

When food products such as milk are sterilized in glass jars, a certain amount of breakage always occurs due to defective jars being subjected to mechanical or thermal shocks. Although this breakage may be minor, when jars are handled in reel and spiral rotary cookers, the broken jars will build up on the floor of the cookers and will interfere with the unbroken jars thereby incurring still greater breakage.

Accordingly, it is one object of the present invention to provide a method of and apparatus for processing products in glass jars without risking the danger of process interference because of jar breakage.

Another object is to provide a method of and apparatus for processing glass jars in reel and spiral cookers and coolers without danger of process interference because of glass jar breakage.

Another object is to provide a method of and apparatus for individually confining containers, such as glass jars, for subjecting the confined containers to a heat treatment process while confined, and for releasing the containers from individual confinement only after completion of the heat treatment process.

Another object is to provide apparatus for individually confining containers in capsules and for advancing the confined containers completely through a heat treatment apparatus before opening the capsules and discharging the containers, either broken or intact, externally of the heat treatment apparatus.

Another object is to provide an apparatus for individually confining jars in capsules.

Another object is to provide an apparatus for removing encapsulated jars from confinement.

Another object is to provide a capsule for individually confining jars therein.

Another object is to provide an apparatus for draining water from a pressure processing chamber and for introducing said water into an atmospheric processing chamber.

These and other objects and advantages of the present invention will become apparent from the following description and the accompanying drawings, in which:

FIGURE 1 is a plan diagrammatically illustrating a preferred disposition of the components of the sterilizing system of the present invention on a work floor.

FIGURE 2 is an enlarged diagrammatic end elevation of part of the apparatus of FIGURE 1, illustrating the placement of five reel-and-spiral type processing units through which the glass jars are passed.

FIGURE 3 is a vertical section taken along lines 3—3 of FIGURE 1 diagrammatically illustrating a hot water recirculation system interconnecting the pressure preheater with an atmospheric preheater.

FIGURE 4 is an enlarged, exploded perspective, partly broken away, illustrating the position of a jar relative to a cartridge and carrier of the present invention prior to being encapsulated within the cartridge and carrier.

FIGURE 5 is a vertical central section through a telescoping capsule formed by the cartridge and carrier, illustrating the manner in which a jar is confined therein.

FIGURE 6 is a side elevation with parts broken away illustrating a second embodiment of the telescoping capsule, which embodiment includes a plastic cartridge.

FIGURE 7 is an enlarged end elevation, with parts broken away, illustrating the capsule loader and the mechanism for feeding the loaded capsules into the atmospheric preheater of the system of FIGURE 1.

FIGURE 8 is an enlarged front elevation of the capsule loader of FIGURE 7.

FIGURE 9 is an enlarged fragmentary section taken on lines 9—9 on FIGURE 8.

FIGURE 10 is an enlarged fragmentary horizontal section taken along lines 10—10 of FIGURE 8.

FIGURE 11 is a vertical section taken along lines 11—11 of FIGURE 8.

FIGURES 12 and 12A are arcuate sections forming a diagrammatic developed view of the inner surface of the shell of the capsule loader, FIGURE 12 being taken along lines 12—12 of FIGURE 11 and FIGURE 12A being taken along lines 12A—12A, and the sections being arranged so that when the sections are placed end-to-end with lines x—x of FIGURE 12 overlying lines y—y of FIGURE 12A the complete view of the inner surface is formed.

FIGURES 13, 14 and 15 are enlarged diagrammatic vertical sections taken along lines 13—13, 14—14 and 15—15 of FIGURE 11, respectively.

FIGURE 16 is an enlarged vertical section taken along lines 16—16 of FIGURE 15 illustrating a cartridge and carrier aligning device.

FIGURE 17 is an enlarged vertical section taken along lines 17—17 of FIGURE 7.

FIGURE 18 is an enlarged horizontal section taken along lines 18—18 of FIGURE 7 illustrating a reject mechanism and a capsule letdown device.

FIGURE 19 is an enlarged section taken along lines 19—19 of FIGURE 18 illustrating the manner of rejecting an improperly formed capsule.

FIGURE 20 is a diagrammatic perspective of a capsule twister and a capsule unloader shown associated with an atmospheric cooler, the view being taken looking substantially in the direction indicated by lines 20—20 of FIGURE 1.

FIGURE 21 is a diagrammatic side elevation of the capsule unloader of FIGURE 20, certain parts being broken away.

FIGURE 22 is an enlarged perspective, with parts broken away, of the carrier discharge end of the capsule unloader.

FIGURE 23 is an enlarged vertical section taken along lines 23—23 of FIGURE 21.

FIGURE 24 is an enlarged vertical section taken along lines 24—24 of FIGURE 21.

FIGURE 25 is a diagrammatic perspective illustrating the drive for the capsule twister and capsule unloader of the system.

FIGURE 26 is a perspective showing the structure for mounting certain magnets used in the capsule unloader.

The continuous sterilizing system of the present invention is provided for the purpose of processing containers such as glass jars J (FIG. 4) in reel and spiral cookers and coolers in such a manner that, even if a container breaks, it will not interfere with the sterilizing process.

Although the containers J will hereinafter be referred to as glass jars, it will be appreciated that other articles such as containers made of plastic, aluminum, or other material, said articles being either symmetrical or irregular in configuration, may also be handled in the apparatus of the present invention. For example, non-rolling containers such as those that are square or hexagonal in transverse cross-section may be processed.

In general, the sterilizing process is preformed in an apparatus which is adapted to handle jars J that are first filled with a product such as milk, and are then closed and capped by a conventional filling and closing apparatus that is indicated generally by the numeral 30 (FIG. 1). Each jar is then advanced into a capsule loader 32 of an encapsulating and loading apparatus 33 and is positioned between a cartridge 34 and a carrier 36 as indicated in FIGURE 4. As the jar J. cartridge 34, and carrier 36 are advanced through the capsule loader 32, the cartridge 34 and the carrier 36 are urged into telescoped relation to provide a capsule 38, with the jar positively confined or encapsulated therein as indicated in FIGURE 5. The capsule 38 with the container confined therein is then successively fed into water at approximately 140°–212° F. in an atmospheric prehater 40 (FIG. 1); into steam at approximately 235° F. in a pressure preheater 42; into steam at approximately 265° F. in a sterilizer 44; into water at approximately 195° F. in a pressure cooler 46; and finally into water at approximately 70°–90° F. in an atmospheric cooler 48.

Each capsule 38 with the sterilized and cooled jar therein is then advanced through a twister 50 (FIGS. 1 and 20) which moves the capsule 38 from a horizontal to an upright position. The capsule 38 is then moved to a capsule unloader 52 wherein the carrier 36 and cartridge 34 are magnetically withdrawn from around the jar, and the jar is discharged from the system by a conveyor 54. The empty cartridge 34 and carrier 36 are then returned to the capsule loader 32 by return conveyors 56 and 58, respectively.

Five heat treatment vessels 40, 42, 44, 46 and 48 have been shown in the preferred embodiment of FIGURES 1 and 2, however, it will be understood that other numbers and arrangements of vessels may be employed. The vessels are of the reel-and-spiral type and may be constructed and arranged as indicated in detail in United States Patent No. 2,536,115 to P. C. Wilbur. Although the Wilbur patent discloses angle carrier bars, it is to be understood that curved carrier bars may be substituted for the angle bars which curved bars may be of the type disclosed in the patent to Mencacci No. 3,181,692.

As seen in FIGURE 7, each vessel comprises a generally cylindrical shell 51 in which an elongate reel 53 is journalled for rotation about a horizontal axis. A plurality of longitudinally extending angle bars 55 are secured to the periphery of the reel to form a series of longitudinally extending can channels. A T-iron guide track 57 secured to and extends in a helical path around the inside of the shell from an inlet opening at one end of the vessel to a discharge opening at the other. As the reel rotates, the helical guide track 57 causes the cans to move longitudinally in the shell toward the discharge opening while being subjected to a heating or cooling medium in the vessel. The processing temperatures of the treating medium and the time of treatment may vary according to the product being handled, and may have the values disclosed in the abovementioned Wilbur patent, if milk is the product being handled. The reels of all processing vessels are continuously driven by a motor 62 (FIG. 1) and a gear train comprising mating gears 64, 66, 68, 70, 72, 74, 76, 78 and 80, the gear 64 being keyed to the motor drive shaft and the other gears being keyed to the drive shafts of associated reels.

Although the present application completely discloses and broadly claims the encapsulating and loading apparatus 33, the capsule twister 50, and the capsule unloader 52 and their interaction, the details of each of these structures are claimed in the following separate applications filed on even date herewith. The encapsulating and loading apparatus has been described and claimed in an application of Milton L. Croall et al. for United States Letters Patent having Ser. No. 472,969, now Patent No. 3,388,528; the capsule twister 50 has been described and claimed in an application of Milton L. Croall for United States Letters Patent having Ser. No. 472,975, which issued on Apr. 18, 1967 as Patent No. 3,314,522; and the capsule unloader has been described and claimed in an application of Raymond J. Bell for United States Letters Patent having Ser. No. 472,976 which issued on Apr. 18, 1967 as Patent No. 3,314,560.

An important feature of the invention resides in the fact that the jars J are individually confined within a capsule 38 of a size and shape which may be reliably handled by the several heat treatment vessels. By confining an individual jar in a separate capsule, any defective jar which is broken by thermal or mechanical shock is retained in its capsule until after the capsule has been moved through all of the vessels and is subsequently opened.

The capsule 38 illustrated in FIGURES 4 and 5 comprises the cartridge 34 and the carrier 36 both of which are formed of a ferrous metal which may be magnetically attracted. The cartridge 34 includes a cylindrical body 82 which is slightly larger in diameter than the jars J being processed, and has one open end 84 through which the jar is inserted. The other end of the cartridge 34 is partially closed by an end plate 86 which is formed integrally with the body 82 and has an opening 88 therein to permit the heat treating medium to enter the capsule 38. Dimples 90 are formed in the cylindrical body 82 near the end plate 86 to project inwardly and engage the jar and act as a stop which prevents the cap of the jar from contacting the end plate 86. If such contact were permitted, lithography on the jar caps could be damaged by engagement with the end plate 86.

The carrier 36 of each capsule 38 is similar in appearance to the cartridge 34 and includes a cylindrical body 92 of slightly greater diameter than the body 82. The body 92 has an open end 94 which receives the cartridge 34, and a partially closed end defined by a plate 96 integral with the body and having an opening 98 therein. In order to minimize magnetic attraction between the open end 84 of the cartridge and the end plate 96 of the carrier when the end plate 96 is subjected to a magnetic force, an apertured dish 100 of non-magnetic material is rigidly secured to the inside surface of the end plate 96, and includes an annular flange 102 which is spaced from the plate 96 and substantially breaks any magnetic force tending to pull the carrier and cartridge toward each other.

The capsule 38a, shown in FIGURE 6, is a second embodiment which is provided to handle jars having embossed words or legends projecting outwardly from the outer periphery of the jars. It has been discovered that such legends become marked if the jars are permitted to roll within metal cartridges such as that shown in FIGURE 5.

The capsule 38a (FIG. 6) comprises a plastic cartridge 34a which supports the jar but does not mar it and includes a cylindrical body 104 having one end open and the other end substantially closed by an end plate 106 having a hole 108 therein. The end plate 106 of the cartridge is impregnated with a ferrous material so that the cartridge 34a can be magnetically attracted. Jar engaging shoulders 110 are provided in the cartridge 34a to prevent the jar cap from engaging the end plate 106, and slots 112 are provided in the cylindrical body 104 to permit more effective entry of the heat treating medium into the capsule. It will be appreciated that the interior of the cartridge 34a may be formed so as to handle odd shaped article if desired.

The capsule 38a also includes a carrier 36a which is similar to the carrier 36 except that it includes a cylindrical body 114 having a plurality of perforations 116 therein for permitting water and steam to flow into or out of the capsule. Since the cartridge 34a is of plastic material, the carrier 38a need not include a dish of the type required by capsule 38 since there will be no tendency for the cartridge 34a and carrier 36a to magnetically cling to each other.

CAPSULE LOADER

The capsule loader 32 (FIGS. 7–19) receives filled and capped jars J from a feed conveyor 130 and positions a carrier 36 over each jar. Then the loader telescopes a cartridge 34 into the carrier 36 between the carrier and the jar, whereby the jar is then enclosed in a capsule. The loaded capsules are then moved by a timing conveyor 124 (FIG. 7) over a reject mechanism 126 which causes incomplete capsules to drop out of the timing conveyor allowing only properly assembled capsules to move over letdown fingers 128 into the atmospheric preheater 40.

As best shown in the plan view of FIGURE 10, filled jars are received in upright position and in random order on the feed conveyor 130, which may be of the endless belt type and is continuously driven by drive means, such as a motor, not shown. As the jars move along the feed conveyor 130, they are guided into a screw type spacing conveyor 132 by guide rails 134 and 136 (FIG. 10), which rails are secured to the frame 138 of the capsule loader 32 by bolts 140 that extend through slots in the rails and permit transverse adjustment of the rails to accommodate jars of different sizes. The spacing conveyor 132 is journalled in bearings 142 which are secured to the frame for transverse adjustment. The pitch of the screw thread 144 of the spacing conveyor gradually increases in the direction of movement of the jars thereby spacing the randomly spaced jars a predetermined distance from each other as they reach the discharge end of the screw conveyor 132.

A resilient guide rail in the form of a spring 146 is stretched between the rail 134 and a rail segment 148 that is adjustably secured to the frame near the discharge end of the screw conveyor 132. The spring 146 provides a resilient guiding surface which is disposed opposite the inlet end of the screw conveyor and will deflect in the event a jar should engage a ridge 132a of a portion of a screw conveyor 132, as it enters the conveyor, rather than being disposed in the valleys 132b between adjacent ridge portions of the screw thread 144. The resistance to forward movement of the jar by the spring 146 will cause such a mispositioned jar to be forced into the next adjacent valley 132b as the jar moves to the left in FIGURE 10.

The screw conveyor 132 is driven slower than the feed conveyor 130 and in timed relation with a transfer turret 152 which consists of an annular member 150 that is secured to a shaft 156 and has two rings 151 and 153 integrally formed around its periphery. Pockets 154 are provided in the rings 151 and 153 by fingers 155, the pockets being spaced apart a distance equal to the distance between jars at the discharge end of the screw conveyor 132. The shaft 156 is inclined and is journalled in bearings 158 bolted to the frame of the capsule loader 32.

The provision of the two rings 151 and 153 make it possible to handle both tall and short jars in the turret 152 without requiring any alterations to the turret. When tall jars are to be handled, the jars are supported by both rings and when short jars are being handled, the lower ring 153 operates alone and provides sufficient jar-supporting surface to prevent twisting or turning of the jar in the pocket while the jar is moved from a vertical to a horizontal position by the turret. A stationary, curved track 160 (FIGS. 8 and 9) is secured to the frame 138 and includes a bottom-engaging section 162 and a side-engaging section 164 which cooperate to retain the jars in their pockets 154 as the jars are moved from the vertical to the horizontal position.

While moving the jars to a horizontal position, the transfer turret 152 moves the jars upwardly through an opening 167 (FIGS. 11 and 12) on the lower side of a stationary drum 168 (FIGS. 8 and 11) which forms the outer shell of the capsule loader 32. While in the drum 168, the carriers 36 and cartridges 34 are moved into telescoping engagement over the jars to confine each jar in one of the capsules 38.

The jars are transferred one at a time from the turret 152 (FIG. 8) onto an arcuate stripper plate 180 which is formed integrally with the shell 168 adjacent the opening 167. The outer or free end of the stripper plate 180 is provided with slots 182 (FIG. 10) defining fingers 183 which extend into the spaces alongside and between the rings 151 and 153 to intercept and strip each jar from the transfer turret. Immediately inside the opening 167, a jar support and spacer plate 181 is secured to the inside wall of shell 168. This plate 181 may have a tapered leading edge 181a for guiding each jar up onto the plate which is of a thickness adapted to maintain the jar in slightly spaced relation to the inner wall of the shell so that the carriers can easily be telescoped at a subsequent station around the jar without danger of the bottom of the jar engaging the open end of the carrier as will be explained in more detail hereinafter.

As best shown in FIGURE 11, a continuously driven combiner reel 170 is disposed within and is concentric with the shell 168. The reel is mouned on a shaft 172 which is journalled in bearings 173 (FIG. 8) secured to the frame 138 of the capsule loader. The reel 170 includes a pair of spaced wheels 174 and 175 which are keyed to the shaft and have a plurality of equally spaced angle carrier bars 176 secured to the outer periphery of each wheel. The angle bars are spaced sufficinetly from each other and from the under surface of the drum 168 (FIGS. 12 and 13) so that jars J, cartridges 34 and carriers 36, which are fed into pockets 178 defined between adjacent angle bars, will be advanced along the inner surface of the drum 168 upon rotation of the reel 170. As best shown in FIGURE 8, the ends of the shell 168 are secured to side plates 184 and 186 which are apertured to receive the reel shaft 172.

The empty carriers 36 are received from the carrier conveyor 58 (FIG. 1) and are directed into a chute 190 (FIG. 11) which communicates with an opening 191 in the shell and guides the carriers 36 through the opening into the reel pockets 178. The empty cartridges 34 are received from the conveyor 56 and are similarly directed through a chute 188 (FIG. 8) which is identical to chute 190 and is arranged to guide the cartridges 34 through an opening 191a (FIG. 12A) in the shell and into the reel pockets 178.

Referring to FIGURES 12 and 12A, it will be noted that, when these views are placed end-to-end with transverse lines x—x of FIGURE 12 overlying lines y—y of FIGURE 12A, a developed diagrammatic view of the entire inner surface of the shell 168 is provided, the plane of this view being indicated by the circular section lines 12—12 and 12A—12A, respectively, of FIGURE 11. Various operations take place as the jars, carriers, and cartridges are moved around the inside of the shell and, in order to locate the positions at which these operations take place, angular positions around the stationary shell have been indicated on FIGURES 12 and 12A. The zero degree position has been chosen to be the lowermost section of the shell at the area of the opening 167. Accordingly, by referring to FIGURE 11 and FIGURE 12A it will be recognized that the chutes 188 and 190 through which the carriers and cartridges enter the shell are at approximately the 180 degree, or uppermost area of the shell.

In general, three paths A, B and C (FIGS. 12 and 12A) are defined on the inner periphery of the shell, these paths being indicated by centerlines. The entrance opening 167 is located along the central path B and, accordingly, each jar is placed in the central portion of one of the reel pockets and remains in this central position while it is being encapsulated and finally discharged. The opening 191 (FIG. 12A) through which the carriers 36 enter the shell is disposed along path A and, accordingly, the carriers 36 enter the shell at a point 180 degrees from the point of entry of the jars and at a point spaced laterally from the central path B. As will be explained presently, the carriers 36 do not remain in path A but are eventually cammed over to path B. Similarly, since the opening 191a (FIG. 12A) through which the cartridges 34 enter the shell is disposed along path C, the cartridges enter the machine at a point spaced laterally from the central path B and are cammed over to path B to encircle a jar and telescope inside the carrier 36 that has been already positioned around the jar.

Referring to FIGURE 12A, it will be seen that each carrier 36 enters the shell through opening 191 and is moved to the right along path A by an angle bar 176. During the initial portion of its movement downwardly along the inner surface of the shell, the carrier is confined to movement along path A by two longitudinally guide rails 194 and 194a. At approximately the 340° section of the shell, one edge of the carrier engages an inwardly slanted rail 194b which guides the carrier inwardly toward path B. After the carrier passes the 0°–360° section (FIG. 12), it is moved to approximately the 12° section where it rides up onto a relatively thin plate 200 that is secured to the inner face of the shell and extends to approximately the 130° section. The inwardly slanted guide 194b ends before the 90° section is reached and a straight, longitudinally extending guide bar 194c forms a continuation of rail 194b to guide the carrier in a straight line as it is moved along path B.

It will be noted in FIGURE 12 that, as each carrier bar 176 approaches the 90° section of the shell, the cartridge 34 contacts a plate 201 secured to the inner wall of the shell and the carrier continues on a portion 201a of plate 200, which is thin relative to plate 201, as seen in FIGURE 14. These plates urge the cartridge and carrier radially inwardly of the drum so that, as they pass the 90° section, they roll inwardly (FIG. 11) into contact with the upstanding leg 176a of the carrier bar 176. At this time, the inclined guide rail 192b (FIG. 12) has not as yet telescoped the cartridge into the adjacent carrier. In order to position the opened end of the cartridge for telescoping movement into the carrier, each carrier bar 176 (FIG. 15) is provided with an aligning mechanism comprising a guide strip 203 welded to the rear face of the leg 176b, a recess 204 in the leg 176a, and a recess 202 in the capsule supporting leg 176b. The guide strip 203 has a slanted surface 205 leading to a flat surface 205a, and a slanted surface 206 leading to a recess 206a. As seen in FIGURE 15, when the carrier 36 with the jar therein is being moved upwardly in the general direction of arrow Z toward the 90° section of the shell, it rests in the recess 202 of the carrier bar and has been urged by the adjacent guide bar 194c into the recess 206a of the guide strip 203 on the rear wall of the carrier bar next ahead. Similarly, the cartridge 34 rests on the leg 176b of the carrier bar and has been urged inwardly by guide bar 192b until it is in abutting engagement with the surface 205a. As the carrier engages the thin plate 201, it is urged inwardly into the recess 204 of leg 176a. Thus, as seen in FIGURE 16, after the cartridge and carrier pass the 90° section, they are in alignment such that the cartridge 34 can telescope into the carrier under the further urging of the guide bar 192b (FIG. 12). The Telescoping operation continues until the cartridge and carrier reach approximately the 170° section of the shell. As the telescoped unit continues around the shell along the path B, it moves downwardly (FIG. 11) and is finally discharged through an opening 208 in the shell.

The telescoped units, which will hereinafter be referred to as capsules, gravitate from the opening along an inclined support plate 207 (FIG. 7) which forms the floor of a portion of the roller conveyor 124 which includes a pair of spaced vertical mounting plates 210 and 212 (FIGS. 7, 17, 18 and 19). One end of each mounting plate is secured to the frame 138 while the other end is secured to the atmospheric preheater 40 adjacent the feed opening thereof. The feed conveyor 124 comprises a pair of spaced endless chains 214 and 216 (FIGS. 17–19) having a plurality of rotatable rollers 217 carried between the chains at even intervals. The chains are trained around pairs of sprockets 218, 220 and 222, which are keyed to shafts 224, 226 and 228, respectively. The shafts are journalled in bearings 230 secured to the plates 210 and 212.

The feed conveyor 124 is driven in timed relation with the reel 53 of the atmospheric preheater 40 by a gear 232 which is secured to the shaft 236 of the reel 53 and meshes with a gear 234. The gear 234 is keyed to a shaft 238 that is journalled in bearings 239 supported by the atmospheric preheater 40. A chain drive 240 interconnects the shaft 238 with the shaft 228 and drives the feed conveyor at a speed which will deposit the capsules 38 one at a time into the elongated carrier bars 55 (FIG. 7) formed on the periphery of the reel 53 in the atmospheric preheater 40 as disclosed in the above-mentioned patent to Wilbur No. 2,536,115.

As indicated in FIGURE 7, when the capsules 38 are discharged from the opening 208 they will roll down the inclined support plate 207 into abutting contact with each other. As they roll down the plate, each capsule will be engaged and conveyed, one at a time, away from the following capsules in a predetermined spaced and timed arrangement. The feed conveyor 124 moves the capsules upwardly past the reject mechanism 126 and the letdown fingers 128 prior to discharging the capsules into the carrier bars 55 of the preheater 40.

The reject mechanism 126 (FIGS. 7, 15 and 16) is provided to discharge incomplete capsules, that is, a carrier 36 without a mating cartridge 34 or a cartridge without a mating carrier, from the feed conveyor 124 prior to entering the atmospheric preheater 40. The reject mechanism 126 comprises a pair of upwardly inclined support rails 244 and 246 (FIG. 17) which are spaced apart a distance slightly less than the length of the carrier. The support rails 244 and 246 are supported by the mounting plates 210 and 212, respectively. In order to maintain properly assembled capsules 38 centered and supported by the rails 244 and 246, guide rails 250 and 252 (FIG. 18) are mounted above the upwardly inclined run of the chain conveyor 124 in position to engage the upper portions of the end faces of the cartridges 34 and carriers 36, respectively. The guide rails 250 and 252 are likewise connected to the vertical mounting plates 210 and 212, respectively, by suitable brackets 254. A leaf spring 256 has one end bolted to a bracket 258 that is supported by the rail 252, and has its other end projecting through a slot in the rail 252 into the path of movement of the capsules 38 as they move over the rails 244 and 246 of the reject mechanism 126.

As clearly shown in FIGURE 19, the spring 256 forces the capsule 38 to the left so that the cartridge of each assembled capsule engages the guide rail 250 and remains supported by the support rails 244 and 246, while the open end of a carrier 36 without a mating cartridge 34, or the end plate of a cartridge without the mating carrier will engage the rail 250, causing the foreshortened unit to fall downwardly between the supporting rails 244 and 246 and be rejected from the feed conveyor 208.

The properly formed capsules 38, after moving past the reject mechanism 126, are moved upwardly along support rails 260 and 262 (FIG. 18). The rails 260 and 262 define extensions of the rails 244 and 246 but are spaced closer together. Upon reaching the upper discharge end of the feed conveyor 208, the capsules roll over the letdown fingers 128 which are integral with and form extensions of the rails 260 and 262. The letdown fingers 128 (FIG. 7) project within the atmospheric preheater 40 and into slots (not shown) formed in the carrier bars 55 of the reel 53. Thus, the letdown fingers 128 serve to gently lower the filled capsules 38 into the carrier bars 240 thereby greatly minimizing mechanical shock to the jars within the capsules 38.

The drive for the screw conveyor 132, the transfer turret 152, and the combiner reel 170 is best shown in FIGURES 7, 8, 10 and 11. The drive comprises a variable speed gear motor 276 (FIG. 11) having an output shaft 278 that is connected by a chain drive 279 to a slip clutch 280 of the type marketed by the Mercury Clutch Division of Automatic Steel Products, Inc., Canton, Ohio under model No. AC-4868. The slip clutch 280 is mounted on an drives a shaft 282 which is journalled in the frame 138 and has a bevel gear 284 (FIG. 10) keyed thereon. The bevel gear 284 meshes with a mating gear 286 that is keyed to one end of a shaft 288 that is suitably journalled in the frame 138 of the machine and is perpendicular to the shaft 282. A sprocket 290 is keyed to the other end of the shaft 288. The screw conveyor 132 is driven by a chain 291 which is trained around the sprocket 290, around a sprocket 292 keyed to the drive shaft 294 of the screw conveyor 132, and around a take-up sprocket 296 that is journalled on a bracket 298 adjustably mounted on the frame 138 of the capsule loader 32.

The transfer turret 152 is driven from a gear 300 which is keyed to the shaft 282 and meshes with a larger gear 302 that is keyed to one end of an intermediate shaft 304. A bevel gear 306 (FIG. 9) keyed to the other end of the intermediate shaft 304 meshes with a bevel gear 308 keyed to the lower end of the turret shaft 156.

The combiner reel 170 is driven from the gear 302 which meshes with a larger diameter gear 310 which is keyed to the reel shaft 172. The direction of rotation of the screw conveyor 132, the transfer turret 152 and the combiner reel 170 is indicated by arrows in FIGURES 7, 8 and 10.

As mentioned previously, the filled capsules 38 are progressively passed through the atmospheric preheater 40, the pressure preheater 42, the sterilizer 44, the pressure cooler 46 and the atmospheric cooler 48.

The heating medium in the atmospheric preheater 40 is water which is maintained at shaft level by suitable controls (not shown) while the heating medium in the pressure preheater 42 is steam that is maintained at the desired temperature and pressure. Because of the relatively close fit between the cartridges 34 and the carriers 36 when telescoped together as best shown in FIGURE 5, water is trapped within the capsules and is carried from the atmospheric preheater 40 to the pressure preheater 42 when the capsules 38 are transferred from the atmospheric preheater to the pressure preheater. After prolonged operation, the carry-over water deposited in the pressure preheater would build up to such an extent that it would detrimentally affect the operation of the pressure preheater 42 if not removed therefrom.

It is a feature of the invention to provide a water return system 314 (FIG. 3) which not only removes the water from the pressure preheater 42 but also serves to supply make-up water as well as heat to the atmospheric preheater 40. The water return system comprises a conduit 316 that is connected to the bottom portion of the pressure preheater 42 near the feed end thereof and communicates with a steam trap 318 of the usual well known type which blocks the passage of steam but permits the passage of water. A conduit 320 is connected between the discharge end of the steam trap 318 and the suction opening of a pump 322. A conduit 324 is connected to the discharge opening of the pump 322 and has its free end communicating with the discharge end of the atmospheric preheater 40. The free end of the conduit 324 is preferably disposed slightly below the water level in the atmospheric preheater 40.

Since the flow of water induced by the transfer of capsules 38 from the atmospheric preheater 40 to the pressure preheater 42 is relatively large and could not be entirely accommodated by the steam trap 318, a by-pass conduit 326 is connected between the conduits 316 and 320. A valve 328, such as a control valve that is responsive to the level of water in the preheater 42, is connected in conduit 326 and is effective to prevent the flow of steam therethrough if the water level in the pressure preheater 42 falls below a predetermined level. A manually operated valve may be used in conduit 326 so that conduit 326 may be closed when steam begins to escape from preheater 42. By discharging the carry-over water into the atmospheric preheater 40 near the hot or discharge end thereof as indicated in FIGURE 1, it will be appreciated that the carry-over water will add a substantial amount of heat to the water in the atmospheric preheater 40. Since this addition of heat is at a point where the jars have already been raised to a temperature near the boiling point of water, the danger of applying an excessive thermal shock to the jars is minimized while the jars are in the atmospheric preheater 40. It will be appreciated that thermal and mechanical shock will also be minimized when the capsules 38 are transferred from the 212° F. water in the atmospheric preheater 40 to the 235° F. steam in the pressure preheater 42 since the carry-over water within the capsules absorbs considerable amount of the heat and acts as a cushion against mechanical shock.

Although the pump 322 has been shown in the water return system 314, it will be appreciated that the pump is not needed and can be eliminated if the pressure within the pressure preheater 342 is sufficient to force the water through the system 314 as it is when the temperature therein is 235° F.

After the filled capsules have moved through the atmospheric preheater 40 and pressure preheater 42, the capsules 38 are progressively advanced through the sterilizer 44, the pressure cooler 46, and the atmospheric cooler 48 in the usual manner before being transferred to the capsule unloader 52.

CAPSULE UNLOADER

The capsule unloader 52 (FIGS. 1 and 20) includes the twister 50 which receives capsules from the atmospheric cooler 48 with their longitudinal axes disposed horizontally. The twister 50 turns the capsules through 90° so as to move the capsules 38 to an upright position on the upper run 340a (FIG. 20) of a cartridge conveyor 340 with the carriers 36 of the capsules uppermost. The carriers 36 are then magnetically attracted to an upwardly inclined overhead carrier conveyor 342 and are withdrawn from the associated cartridges before being discharged onto the carrier return conveyor 58 for return to the capsule loader 32. The cartridges 34, with the processed jars J therein, are then conveyed around a magnetic drum 344 (FIGS. 21 and 22) permitting the jars to gravitate onto the upper run of a jar conveyor 346. The cartridges 34 are magnetically held against the lower run 340b of the cartridge conveyor 340 and are gradually lifted upwardly away from the jars. After the cartridges 34 have been lifted clear of the jars, the cartridges are discharged from the unloader 52 onto the cartridge return conveyor 56 (FIG. 1) which returns the cartridges to the capsule loader 32. The processed jars are discharged from the jar conveyor 346 onto any suitable discharge means such as a takeaway conveyor or the like (not shown).

The twister 50 includes a twister conveyor 348 (FIGS. 20 and 21) which is similar to the timing conveyor 124 (FIG. 7) and comprises a pair of endless conveyor chains 350 having a plurality of evenly spaced transvers rollers 352 journalled thereon. The chains 350 are trained around two drive sprockets 354 (FIG. 20) and around driven sprockets 356 keyed to shafts 358 and 360, respectively (FIG. 21) journalled in the frame 362 of the unloader. The conveyor 348 is continuously driven, causing capsules 38 supported on an inclined gravity ramp 364 to enter between adjacent rollers 352 and to positively advance along the ramp 364 which is twisted thereby causing the capsules 38 to assume an upright position on the cartridge conveyor 340 with the carrier 36 uppermost.

The twister 50 is described and claimed in the aforementioned Milton L. Croall Patent No. 3,314,522. If a more detailed description of the twister 50 is required, reference may be had to the Croall patent.

The continuously driven cartridge conveyor 340 comprises an endless non-magnetic belt that is trained over the magnetic drum 344 and over guide rollers 368, 370, 372 and 374 keyed to shafts 378, 380, 382 and 384, respectively, which shafts are journalled in the frame 362 of the capsule unloader 52. The drum 344 may be of the type disclosed in the patent to Cmiel No. 3,120,891, and in general comprises a pair of non-magnetic discs 369 and 371 which have hubs keyed to a shaft 376. A pair of pole strips 373 and 375 of magnetic material are disposed near the outer periphery of the discs 369 and 371, respectively, and are bolted to bar magnets 377 which are in turn bolted to the discs 369 and 371. A cylindrical flange 379 is formed integrally on the outer periphery of the disc 369 and is of the same outside diameter as the pole strips 373 and 375. The magnets are oriented so that the north poles are all connected to the strip 373 and the south poles are all connected to the strip 375. The upper run 340a and the lower run 340b of the cartridge conveyor 340 are supported by an elongated subframe 386 (FIGS. 23 and 24) which includes a pair of spaced channel members 388 and 400 that have a plurality of spaced transverse upper and lower angle straps 402 bolted thereto. A longitudinally extending, inverted channel shaped belt guide 404 (FIG. 24) is secured to the upper straps 402 to support the upper run 340a and, elongated capsule guide rails 406 are secured to brackets 408 bolted to the belt guide 404. Spaced belt supporting bars 410 and 412 slidably support the lower run 340b of the conveyor 340 as best illustrated in FIGURE 24. The belt supporting bars 410 and 412 are bolted to angle clips 414 and 416 which are, in turn, bolted to the lower transverse angle straps 402.

A plurality of stabilizing permanent magnets 418 (only one being shown in FIG. 24) are disposed below a portion of the downstream end of the upper run 340a of the conveyor 340 and serve to magnetically attract the cartridges 34 and pull them down to the upper run 340a of the belt to stabilize the cartridges after the carriers 36 have been withdrawn therefrom. The common poles of the magnets 418 are bolted to flat magnetic rails 420 and 422, which extend from point D (FIG. 21) to point E, and the belt guide 404 which supports the belt is secured to brackets 424 that are bolted to the upper angle straps 402. As seen in FIGURE 24, each magnet 418 is a horseshoe magnet, and they are so oriented that the rails 420 and 422 constitute north and south poles, respectively. If desired a non-magnetic wear strip 421 may be connected across the rails. Similarly, a plurality of cartridge lifting horseshoe magnets 426 are secured to flat, downwardly facing magnetic rails 428 and 430 which extend along lower run 340b from the magnetic drum 344 (FIG. 21) to a cartridge discharge point 432 at the discharge end of the lower run 340b of the cartridge conveyor 340. The magnetic rails 428 and 430 are secured to brackets 434 which are bolted to the lower angle straps 402.

In order to maintain control of the cartridges 34 and jars J as they move around the drum 344 in clockwise direction (FIG. 21), a plurality of equally spaced horseshoe magnets 442 are secured to arcuate magnetic rails 443 (FIGS. 22 and 23) which are suitably secured to the frame 362 of the capsule unloader 52 and engage the side surfaces of the cartridges 34 to further stabilize the cartridges as they move around the drum. A semi-cylindrical guide rail 444 (FIG. 22) is disposed around the drum in position to hold the jars within their cartridges 34 and to guide them onto the jar conveyor 346. The guide rail 444 has angle brackets 448 and 450 welded thereto, which brackets are bolted to the frame 362 of the capsule unloader 52.

The continuously driven carrier conveyor 342 comprises an endless non-magnetic belt 456 (FIG. 21) that is trained around a drive roller 458, an idler roller 460, around five idler rollers 462, and around a take-up roller 464. The rollers 458 and 460 are keyed to shafts 466 and 468, respectively. The idler rollers 462 are keyed to shafts 463 and the take-up roller 464 is keyed to shaft 469. The shafts of conveyor 342 are journalled in bearings that are bolted to elongated upwardly inclined channel members 470 and 472 (FIG. 24) of a carrier conveyor sub-frame 480. The channel members are welded to the main frame 362, and the lower surfaces of the channel members are interconnected at spaced intervals by angle brackets 482. A pair of elongated angle belt guides 484 and 486 are bolted to angle clips 488 and 490 which are in turn bolted to the angle brackets 482. A plurality of carrier magnets 492 have their common poles secured to magnetic rails 494 and 496 (FIG. 26), and the rails are secured to the angle brackets 482 by brackets 498. FIGURE 26 discloses a typical mounting for all of the horseshoe magnets used in the machine.

As the capsules 38 move along the cartridge conveyor 340 under the carrier conveyor 342, the carrier magnets 492, some of which are shown in phantom in FIGURE 21, magnetically attract the carriers 36 and gradually lift the carriers free from the cartridges 34. As the carriers approach the discharge end of the carrier conveyor 342, the spacing of the magnets 492 is increased thereby reducing the magnetic force attracting the carriers.

The discharge chute 500 comprises six curved rods 502 which are welded to several generally rectangular frame members 504 and slidably engage the ends and sides of the carriers 36. The upper end of the chute 500 is bolted to the belt guides 484 and 486 and is positioned to receive the carriers 36. The uppermost curved rod 502a is shorter than the other rods 502, and the last magnet 492a (FIG. 22) as well as the associated magnetic rails, are positioned so that the carriers 36 will be completely released from the conveyor 342 at a point between the forward end of the rods 502 and the forward end of the upper rod 502a. The chute 500 then guides the freed carriers 36 onto the carrier return conveyor 58 (FIG. 1) which returns the carriers to the capsule loader 32.

As best illustrated in FIGURES 22 and 23, as the cartridges and jars travelling along conveyor run 340a approach the magnetic drum 344, they are deflected by a cam plate 506 to the right (FIG. 22) of the vertical plane of movement of the carriers 36 which are supported by the conveyor 342. Thus the normal path of the cartridges 34 is not directly under the path of the carriers 36 but is to one side thereof and, therefore if a cartridge 34 becomes wedged in the associated carrier and projects downwardly therefrom, the defective carrier and cartridge will not be carried over the guide rail 444 around drum 344 but will be advanced past the side of the guide rail 444 before it is dropped from the carrier conveyor 342. Therefore, when the wedged cartridge is released from the carrier, it will not drop on the rail 444 or into the path of movement of cartridges 34 and jars moving along the cartridge conveyor 340.

After the cartridges 34 and jars J move around the magnetic drum 344, the jars are received on the jar conveyor 346, and the cartridges 34 are magnetically attracted to the lower run 340b of the cartridge conveyor 340 as previously described. The cartridges 34 are advanced by the cartridge conveyor 340 to the cartridge discharge point 432 (FIG. 21) at which point the magnetic attraction terminates and the cartridges are released into a cartridge chute 508 which comprises a plurality of curved rods 510 that are welded to and held in spaced relation by rectangular frame members 512. The chute 508 is bolted to the sub-frame 386 with its upper end disposed in position to receive the empty cartridges 34 from the cartridge conveyor 340. The forward end 514 of the uppermost rod 510a terminates downstream of the ends of the other rods 510 so that the upper side of the chute is open and the cartridges may freely drop into the chute 508 upon loss of magnetic attraction and be guided by the chute onto the cartridge return conveyor 56 (FIG. 1).

The processed jars J are received on the jar conveyor 346 (FIG. 21) which comprises an endless belt 516 that is trained around a drive roller 518, a driven roller 520, and around idler rollers 522. The drive roller 518 is keyed to a shaft 524 journalled in bearings 526 secured to the frame 362 of the capsule unloader 52. The driven roller 520 is keyed to a shaft 528 journalled in bearings of a take-up device 530 that is secured to the frame 362 in the usual manner. The idler rollers are keyed to shafts 532 (FIG. 24) journalled in bearings 534 secured to channel members 536 and 538 of a sub-frame 540.

A plurality of straps 542 are secured to the lower edges of the channel members 536 and 538, and a plurality of angle brackets 544 are secured to the upper edges of the channel members. As best shown in FIGURE 24, an inverted channel belt guide 546 is secured to the angle brackets 544 by angle clips 548 and cooperating cap screws. The processed jars are conveyed off the discharge end of the jar conveyor 346 onto any suitable collecting means such a take-away conveyor (not shown).

The drive train 550 (FIGS. 21 and 25) for the capsule unloader 52 receives power from a variable speed motor 552 which is connected by a chain drive 553 to the drive shaft 554 of a right-angle gearbox 556. The output shaft 558 of the gearbox 556 is connected by a chain drive 560 to the twister conveyor drive shaft 358 which is suitably journalled on the frame 362 of the capsule unloader 52. A drive gear 562, keyed on the twister conveyor drive shaft 358, meshes with a driven gear 564 keyed on a shaft 566 journalled on the frame of the unloader. The shaft 566 is coupled to the drive shaft 567 of the right angle gear unit 568 which has its output shaft coupled to a multisectioned drive shaft 572 which extends longitudinally of the unloader 52. The drive shaft 572 is coupled to the input end of a right angle gear unit 574 which has its output shaft coupled to the drive shaft 466 of the carrier conveyor 342 thereby driving the conveyor 342 in the direction of the arrows in FIGURE 21.

An intermediate right angle gear unit 578 is coupled to the shaft 572 and has its output shaft coupled to a vertical shaft 582 which is coupled to a right angle gear unit 586. The output shaft of unit 586 is coupled to a gear shaft 588 that is journalled on the frame 362 of the unloader 52. A drive gear 590 keyed on the shaft 588 meshes with a driven gear 592 keyed on the drive shaft 524 of the jar conveyor 346 and drives the same in the direction indicated by arrows in FIGURE 21.

The cartridge conveyor 340 is driven in the direction of the arrows in FIGURE 21 by a belt drive 594 (FIG. 25) connected between the twister drive shaft 358 and the drive shaft 385 of the conveyor 340.

OPERATION

Although the operation of the apparatus of the present invention has been included with the description of the several components, a brief resume of the operation will follow.

Filled and sealed jars J to be processed are advanced by the conveyor 130 (FIG. 7) into engagement with the screw conveyor 132 which singulates and spaces the jars J a predetermined distance from each other before feeding the jars one at a time into the pockets 154 of the inclined transfer turret 152. The transfer turrent 152 shifts the jars from a position wherein their longitudinal axes are vertical to a position wherein the axes are horizontal, at which time the ars are moved upwardly through the opening 167 (FIG. 11) in the shell of the capsule loader to a position above the stripper plate 180 and between carrier bars 176 of the reel 170. Empty cartridges 34 and carriers 36 which have previously been introduced into the drum between the bars 176 of the capsule loader 32 are disposed on opposite sides of the jars and are cammed toward each other to enclose the jars thereby defining capsules 38 as the reel 170 advances the jars J, cartridges 34 and carriers 36 upwardly within the drum 168.

The capsules 38, each carrying an individual jar J, are then discharged from the drum 168 and are moved into the free roller timing conveyor 124 (FIG. 7), which conveyor advances the capsules over the reject mechanism 126 which discharges all incomplete capsules from the system. The capsules 38 are then advanced into the carrier bars 55 of the reel 53 of the atmospheric preheater 40 after moving over the let-down fingers 128 which gently place the capsules onto the bars 55, thereby miminizing mechanical shock during transfer. The capsules 38 are then passed through the hot water in the reel and spiral atmospheric preheater 40 and are transferred to the pressure preheater 42 through a conventional pressure valve.

Since the cartridges 34 and the carriers 36 of the capsules 38 have their lower portions fitted tightly together as indicated in FIGURE 5, water from the atmospheric preheater 40 is carried into the pressure preheater 42. This water is raised in temperature while in the pressure preheater 42 and is returned to the atmospheric preheater 40 through the water return system 314 (FIG. 3) to air in supplying heat to the water in the atmospheric preheater.

The capsules are then passed through the pressure preheater 42, the sterilizer 44, the pressure cooler 46, and the atmospheric cooler 48 thereby sterilizing the product within the jars. Although the transfer of the capsules 38 from processing vessel to processing vessel is relatively gentle due to the use of let-down fingers which are similar to the fingers 128 at each transfer point, and also due to the presence of cushioning water within the capsules at certain of these transfer points, the jars are subjected to thermal shock during such transfer and may break. If such breakage occurs, the broken pieces of the jar will be confined within the associated capsule until the capsules have been discharged from the atmospheric cooler 48 and are opened by the capsule unloader 52.

Upon being discharged from the atmospheric cooler 48 (FIG. 20), the capsules are advanced through the twister 50 by the twister conveyor 348, thereby shifting the longitudinal axes of the capsule 38 from a horizontal to a vertical position. The capsules 38 are then advanced a short distance by the upper run 340a of the cartridge conveyor 340 and become positioned below the carrier conveyor 342. The carriers 36 are then magnetically attracted to the carrier conveyor, and are withdrawn from the cartridges 34 for subsequent discharge through the chute 500 onto the carrier return conveyor 58 which returns the empty carriers to the capsule loader 32. The cartridges 34 with jars J therein are advanced around the magnetic drum 344 to invert the cartridges and deposit the jars on the jar conveyor 346. The cartridges 34 are magnetically attracted to the upwardly inclined lower run 340b of the cartridge conveyor 340 and are withdrawn from the conveyor 340 through the cartridge chute 508 onto the cartridge return conveyor 56 for return to the capsule loader 32. The processed jars J are discharged from the jar conveyor 346 onto any suitable collecting means such as a take-away conveyor (not shown).

From the foregoing description it is apparent that the present invention provides an efficient method of confining individual containers, such as glass jars, in telescoping capsules so that the jars can be moved through a reel and spiral type processing vessel without danger of the accumulation of broken glass within the vessel since such broken glass is confined in the capsules until after the capsules have been removed from the vessel. The invention also provides novel apparatus for performing the above method. Additionally, the present invention includes two embodiments of a telescoping capsule which supports jars in such a way as to prevent damage to lithography of the jar caps as well as preventing damage to raised indicia on the surface of the jars.

Another feature of the invention is that the water return system is effective to return carry-over water, which water has been carried by the capsules from the atmospheric preheater to the pressure preheater. The water return system returns the carry-over water to the atmospheric preheater after first raising the temperature of the water due to its contact with steam in the pressure preheater.

It is also evident that if the container is made of a plastic or other material that might deform due to rough handling, excessive heat, or excessive pressure differential, the capsule of the present invention will prevent any deformed part of the container or any part, such as the container cap, that might be released due to the deformation of the container, from becoming wedged or jammed in the processing apparatus.

It will also be understood that it is within the concept of the present invention to use capsules that are completely closed only at the wall portions, such as the bottom wall, where glass particles can normally fall out. Thus an open top carrier might be used if it is maintained in upright position at all times and if the side walls are high enough to restrict the outward movement of glass particles, deformed containers and the like.

It is to be understood that the term capsule as used herein is to be considered broad enough to cover any type of carrier which is capable of confining a container therein even though the container may be broken into small pieces.

While one embodiment of the present invention has been shown and described, it will be understood that other changes and modifications may be made therein without departing from the spirit of the invention or the scope of the appended claims.

Having thus described the present invention and the manner in which the same is to be used, what is claimed as new and desired to be protected by Letters Patent is:

1. A method of processing food products in sealed glass containers comprising the steps of moving the glass containers along a predetermined path which includes a first helical portion and a second helical portion, individually encapsulating each glass container within predetermined limits of confinement only slightly larger than the glass container while moving along said path prior to movement into said helical portions, applying a hot water heating medium to the encapsulated glass containers and causing a certain amount of said water to be encapsulated with said glass containers within said limits of confinement when said glass containers are in said first helical portion and prior to transferring said encapsulated glass containers along said path into said second helical portion, applying a second heating medium under superatmospheric pressure to the encapsulated glass containers while said glass containers are moving through said second helical portion of said path whereby said encapsulated water serves to minimize both thermal and mechanical shock to the glass containers as the glass containers are transferred from said first helical portion to said second helical portion, restraining each glass container whether intact or broken within said limits of confinement while passing through said water and said second heating medium, additionally restraining each intact glass container from any significant endwise movement relative to its limits of confinement while moving along first and second helical portions, and releasing each glass container from encapsulation while moving along said path after movement out of said helical portion whereby any broken glass container will be withdrawn from the helical portions of said path before being released from encapsulation.

2. The method of claim 1 including the steps of confining the second helical portion of the path in an atmosphere maintained at superatmospheric pressure, releasing said encapsulated water from encapsulation in said confined atmosphere, heating said released water while in said confined atmosphere, and returning said released water to the hot water being applied to said glass containers while said glass containers are moving through said first helical portion of said path.

3. A process for sterilizing food products contained in sealed glass containers while the containers are individually encapsulated in rigid non-breakable telescoping members, comprising the steps of moving the containers in an upright position along a predetermined path, turning the containers onto their sides, introducing each container between a cooperating pair of telescoping members disposed in axial alignment with the longitudinal axis of the container, encapsulating the containers within the cooperating pairs of telescoping members by moving the members into telescoping engagement over the associated containers at an encapsulating station, retaining the telescoping members from separating a distance greater than the telescoping distance, introducing the encapsulated containers into a helical portion of said predetermined path having turns which are sufficiently close together to retain the telescoping members from separating, subjecting the containers to a heat sterilizing medium while moving along said helical portion of said path, discharging the encapsulated glass containers from said helical portion while at the same time continuing to retain the telescoping members from separating, separating the telescoping members while moving along said path and discharging the glass containers from said predetermined path, and returning the separated telescoping members to said encapsulating station in position to be telescoped over new glass containers in a new cycle.

4. A process for sterilizing food products contained in glass containers individually encapsulated in rigid non-breakable telescoping members slightly larger than said glass containers so as to confine each container within predetermined limits, comprising the steps of moving a row of said encapsulated containers along a predetermined path, singulating and timing the row of encapsulated containers while retaining the telescoping members from separating, introducing the encapsulated containers into a helical portion of said path, subjecting the encapsulated containers in the helical portion of said path to a hot water medium and causing a certain amount of said water to be encapsulated with said glass containers within said limits of confinement when said glass containers in said helical portion whereby said encapsulated water serves to minimize both thermal and mechanical shock to the glass containers, and discharging the encapsulated containers from said helical portion of said path while continuing to retain the telescoping members from separating whereby the containers whether broken or intact are removed from the hot water medium.

References Cited
UNITED STATES PATENTS

| | | |
|---|---|---|
| 1,543,964 | 6/1925 | Wellman _____ 99—214 |
| 2,144,334 | 1/1939 | Kennedy. |
| 2,719,478 | 10/1955 | Van Der Winden. |
| 3,165,055 | 1/1965 | Van Der Winden. |

FOREIGN PATENTS 714,616  9/1954  Great Britain.

HYMAN LORD, Primary Examiner

U.S. Cl. X.R.

53—167; 99—362

PO-1050
(5/69)

UNITED STATES PATENT OFFICE
CERTIFICATE OF CORRECTION

Patent No. 3,473,934     Dated October 21, 1969

Inventor(s) A. E. PECH

It is certified that error appears in the above-identified patent and that said Letters Patent are hereby corrected as shown below:

Column 3, line 35, change "J." to --J,--. Column 3, line 42, change "prehater" to --preheater--. Column 3, line 74 after "57" insert --is--. Column 5, line 15, change "article" to --articles--. Column 6, line 46, change "mouned" to --mounted--. Column 6, line 52, change "sufficinetly" to --sufficiently--. Column 7, line 41, after "longitudinally" insert --extending--. Column 7, line 65, change "opened" to --open--. Column 9, line 35, change "an" to --and--. Column 11, line 16, change "transvers" to --transverse--. Column 14, line 8, change "385" to --384--. Column 14, line 22, change "ars" to --jars--. Column 14, line 53, change "air" to --aid--. Column 17, line 2, after "containers" insert --are--.

Signed and sealed this 20th day of July 1971.

(SEAL)
Attest:

EDWARD M. FLETCHER, JR.
Attesting Officer

WILLIAM E. SCHUYLER, JR.
Commissioner of Patents